(12) United States Patent
Pulkus et al.

(10) Patent No.: US 11,386,239 B2
(45) Date of Patent: Jul. 12, 2022

(54) TRANSITION FROM A BOOLEAN MASKING TO AN ARITHMETIC MASKING

(71) Applicant: GIESECKE+DEVRIENT MOBILE SECURITY GMBH, Munich (DE)

(72) Inventors: Jürgen Pulkus, Munich (DE); Lars Hoffmann, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 349 days.

(21) Appl. No.: 16/491,896

(22) PCT Filed: Feb. 28, 2018

(86) PCT No.: PCT/EP2018/000081
§ 371 (c)(1),
(2) Date: Sep. 6, 2019

(87) PCT Pub. No.: WO2018/162115
PCT Pub. Date: Sep. 13, 2018

(65) Prior Publication Data
US 2020/0034573 A1    Jan. 30, 2020

(30) Foreign Application Priority Data
Mar. 6, 2017  (DE) .................... 10 2017 002 153.8

(51) Int. Cl.
*G06F 21/75*   (2013.01)
*H04L 9/00*    (2022.01)

(52) U.S. Cl.
CPC ............ *G06F 21/755* (2017.08); *H04L 9/003* (2013.01); *H04L 2209/046* (2013.01)

(58) Field of Classification Search
CPC .............. G06F 21/755; G06F 21/556; G06F 2207/7233; G06F 2207/7238; G06F 7/575;
(Continued)

(56) References Cited

U.S. PATENT DOCUMENTS

| 8,553,877 B2 * | 10/2013 | Scian | H04L 9/003 380/263 |
| 8,707,053 B2 * | 4/2014 | Farrugia | G06F 21/14 380/42 |

(Continued)

FOREIGN PATENT DOCUMENTS

| DE | 102016007189 A1 | 12/2017 |
| EP | 1596527 B1 | 11/2005 |

(Continued)

OTHER PUBLICATIONS

Coron et al., Secure Conversion between Boolean and Arithmetic Masking of Any Order, CHES 2014, LNCS 8731, pp. 188-205, 2014.*

(Continued)

*Primary Examiner* — David Garcia Cervetti
(74) *Attorney, Agent, or Firm* — Workman Nydegger

(57) ABSTRACT

A method for the transition is provided from a Boolean masking of a value to be kept secret to an additive masking of the value to be kept secret. The value to be kept secret is present in the Boolean masking as a representation masked with a first Boolean mask and a second Boolean mask. A first additive mask and a second additive mask are determined for the value to be kept secret. A first masking transition is executed in which the first Boolean mask is converted into the first additive mask. A second masking transition is executed in which the obfuscation value is converted into an additive correction value, and a third masking transition is executed in which the second Boolean mask is converted into the second additive mask.

18 Claims, 1 Drawing Sheet

(58) Field of Classification Search
CPC . H04L 2209/08; H04L 9/003; H04L 2209/04; H04L 9/002; H04L 2209/046
See application file for complete search history.

(56) References Cited

U.S. PATENT DOCUMENTS

| | | | |
|---|---|---|---|
| 9,425,959 B1* | 8/2016 | Pedersen | H04L 9/003 |
| 10,333,699 B1* | 6/2019 | Rohatgi | H04L 9/0662 |
| 2004/0139136 A1* | 7/2004 | Goubin | H04L 9/003 708/490 |
| 2005/0147243 A1* | 7/2005 | Baek | G06F 7/00 380/28 |
| 2005/0232430 A1* | 10/2005 | Gebotys | H04L 9/003 380/286 |
| 2006/0159257 A1* | 7/2006 | Fischer | H04L 9/003 380/28 |
| 2006/0200514 A1* | 9/2006 | Fischer | G06F 21/755 708/446 |
| 2006/0282491 A1* | 12/2006 | Joye | G06F 7/725 708/492 |
| 2007/0058800 A1* | 3/2007 | Neisse | H04L 9/003 380/28 |
| 2007/0188355 A1* | 8/2007 | Baek | H04L 9/003 341/51 |
| 2009/0016523 A1* | 1/2009 | Dupaquis | H04L 9/3252 708/250 |
| 2009/0086961 A1* | 4/2009 | Sauzet | G06F 7/728 380/28 |
| 2009/0092245 A1* | 4/2009 | Fumaroli | H04L 9/003 380/28 |
| 2009/0112896 A1* | 4/2009 | Golic | H04L 9/003 |
| 2009/0116644 A1* | 5/2009 | Klimov | H04L 9/0625 380/252 |
| 2010/0235417 A1* | 9/2010 | Baek | G06F 7/764 708/236 |
| 2011/0013767 A1* | 1/2011 | Kim | H04L 9/0618 380/28 |
| 2011/0044450 A1* | 2/2011 | Choi | H04L 9/003 380/28 |
| 2011/0055591 A1* | 3/2011 | Rivain | H04L 9/003 713/189 |
| 2011/0129084 A1* | 6/2011 | Fumaroli | G06F 21/755 380/28 |
| 2011/0246787 A1* | 10/2011 | Farrugia | G06F 21/60 713/189 |
| 2012/0047417 A1* | 2/2012 | Koike | H04L 9/005 714/E11.044 |
| 2012/0204038 A1* | 8/2012 | Farrugia | G06F 21/14 713/190 |
| 2012/0250854 A1* | 10/2012 | Danger | H04L 9/003 380/28 |
| 2013/0129081 A1* | 5/2013 | Guillet | H04L 9/0618 380/28 |
| 2013/0195266 A1* | 8/2013 | Fischer | H04L 9/0643 380/44 |
| 2013/0275545 A1* | 10/2013 | Baptist | H04L 67/42 709/215 |
| 2013/0275776 A1* | 10/2013 | Baptist | H04L 9/0825 713/193 |
| 2014/0006017 A1* | 1/2014 | Sen | H04S 7/30 704/226 |
| 2014/0169553 A1* | 6/2014 | Chen | G06F 7/726 380/28 |
| 2014/0254792 A1* | 9/2014 | Gammel | H04L 9/002 380/28 |
| 2014/0281573 A1* | 9/2014 | Jaffe | H04L 9/003 713/189 |
| 2015/0110266 A1* | 4/2015 | Debraize | H04L 9/3242 380/30 |
| 2015/0172042 A1* | 6/2015 | Karroumi | H04L 9/0625 380/28 |
| 2015/0244524 A1* | 8/2015 | Pulkus | H04L 9/3006 380/28 |
| 2016/0364474 A1* | 12/2016 | Bay | G06F 16/148 |
| 2017/0033921 A1* | 2/2017 | Michiels | G06F 21/14 |
| 2017/0033923 A1* | 2/2017 | Melzani | H04L 9/003 |
| 2017/0244552 A1* | 8/2017 | Thiebeauld De La Crouee H04L 9/003 |
| 2017/0272165 A1* | 9/2017 | Mansouri Rad | H04B 10/85 |
| 2017/0373838 A1* | 12/2017 | Wurcker | G09C 1/00 |
| 2018/0178578 A1* | 6/2018 | Tierney | B32B 3/08 |
| 2018/0351729 A1* | 12/2018 | Tunstall | G06F 21/71 |
| 2019/0050204 A1* | 2/2019 | Hutter | H04L 9/30 |

FOREIGN PATENT DOCUMENTS

| | | | | |
|---|---|---|---|---|
| EP | 1939822 A1 | | 7/2008 | |
| KR | 101586811 B1 * | | 1/2016 | |
| WO | WO-2006058561 A1 * | | 6/2006 | H04L 9/003 |
| WO | WO-2017152056 A1 * | | 9/2017 | G06F 7/58 |

OTHER PUBLICATIONS

Pulkus et al., Switching Blindings with a View Towards IDEA, CHES 2004, LNCS 3156, pp. 230-239, 2004.*

Hutter, M., Tunstall, M. Constant-time higher-order Boolean-to-arithmetic masking. J Cryptogr Eng 9, 173-184 (2019). https://doi.org/10.1007/s13389-018-0191-z.*

Coron JS., Großschädl J., Tibouchi M., Vadnala P.K. (2015) Conversion from Arithmetic to Boolean Masking with Logarithmic Complexity. FSE 2015. Lecture Notes in Computer Science, vol. 9054. Springer https://doi.org/10.1007/978-3-662-48116-5_7.*

Vadnala et al., "Algorithms for Switching between Boolean and Arithmetic Masking of Second Order," Laboratory of Algorithms, Cryptology and Security, pp. 95-110, 2013.

Coron et al., "Secure Conversion between Boolean and Arithmetic Masking of Any Order," Laboratory of Algorithmics, Cryptology and Security, International Association for Cryptologic Research, pp. 188-205, 2014.

Hutter et al., "Constant-Time Higher-Order Boolean-to-Arithmetic Masking," Journal of Cryptographic Engineering, pp. 1-22, 2016.

German Search Report for DE Application No. 102017002153.8, dated Nov. 20, 2017.

International Search Report from PCT Application No. PCT/EP2018/000081, dated Jun. 18, 2018.

"Information Technology Security Techniques—Evaluation Criteria for IT Security—Part 1: Introduction and General Model," ISO/IEC 15408-1, Third Edition, pp.. 1-74, Dec. 15, 2009.

"Information Technology Security Techniques—Evaluation Criteria for IT Security—Part 2: Security Functional Components," ISO/IEC 15408-2, Third Edition, pp. 1-240, Aug. 15, 2008.

"Information Technology Security Techniques—Evaluation Criteria for IT Security—Part 3: Security Assurance Components," ISO/IEC 15408-3, Third Edition, pp. 1-188, Aug. 15, 2008.

von L. Goubin, "A Sound Method for Switching Between Boolean and Arithmetic Masking," Workshop on Cryptographic Hardware and Embedded Systems, vol. 2162 of the Lecture Notes in Computer Science, pp. 3-15, 2001.

von Blandine Debraize, "Efficient and Provably Secure Methods for Switching from Arithmetic to Boolean Masking," Workshop on Cryptographic Hardware and Embedded Systems, vol. 7428 of the Lecture Notes in Computer Science, pp. 107-121, 2012.

* cited by examiner

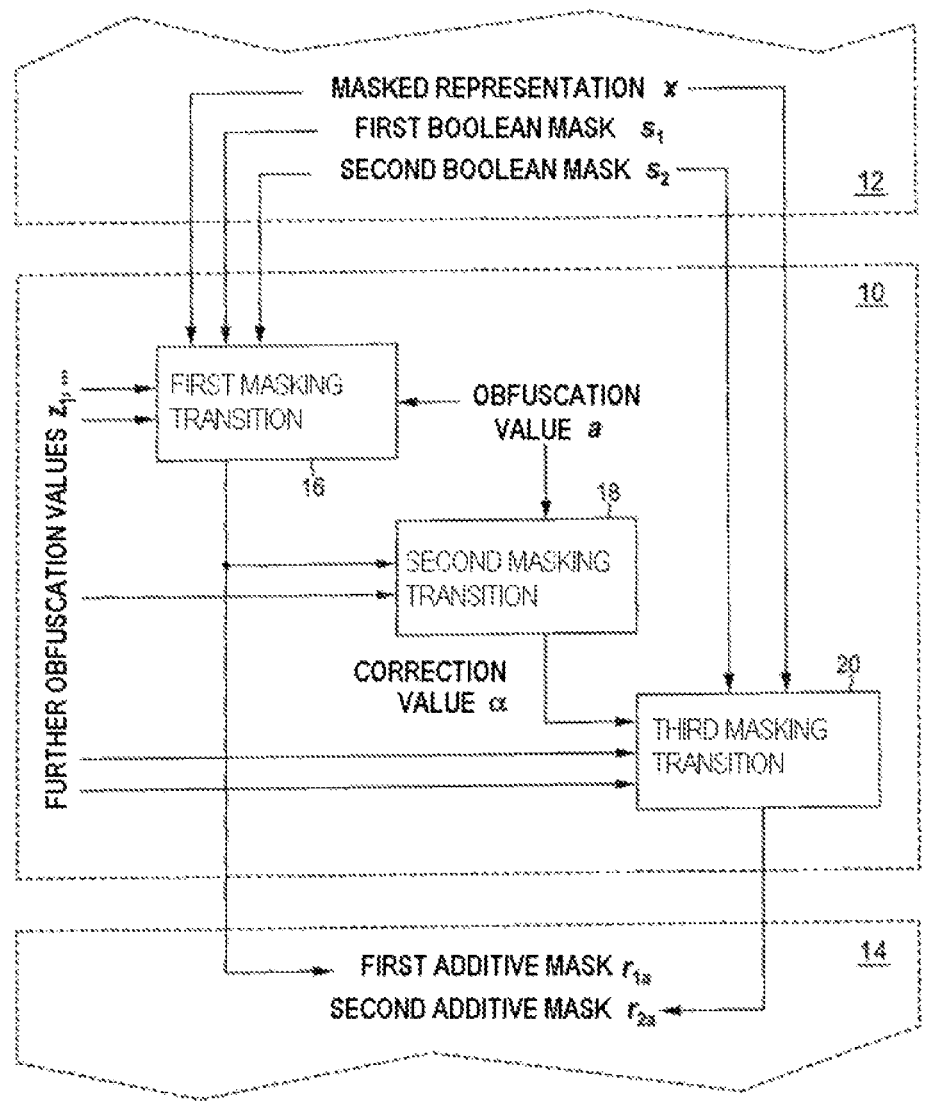

TRANSITION FROM A BOOLEAN MASKING TO AN ARITHMETIC MASKING

BACKGROUND

The invention relates in general to the field of cryptography and more specifically the field of protecting cryptographic calculations from spying out. In particular, the invention relates to the transition from a first masking of a value to be kept secret, based on a Boolean masking rule, to a second masking of the value to be kept secret, based on an additive masking rule. The invention is particularly suitable for the use in a portable data carrier. Such a portable data carrier can, for example, be configured as a chip card (smart card) or as an insertable chip module or as a chip module permanently integrated in a portable device or as a portable resource-limited system.

Portable data carriers are often employed for security-critical applications, for example for the authentication in mobile telephony, as cash cards, as signature cards or signature tokens for electronic signatures and so on. Since unauthorised use could cause considerable damage, the secret data stored on such data carriers must be reliably protected from spying out and manipulation.

A known type of attack method for spying out data are so-called side channel attacks, in which conclusions about the processed data can be drawn by measurements during the program execution. For example, the current consumption of the data carrier and/or other physical parameters such as e.g. electromagnetic emissions or program runtimes can be measured and evaluated. Either the measured properties during one single calculation sequence are examined (e.g. SPA=Simple Power Analysis), or many calculation sequences are observed and statistically evaluated (e.g. DPA—Differential Power Analysis).

In general, one distinguishes between side channel attacks of first, second, third, etc. orders. In a first-order side channel attack, the attacker is able to ascertain one single value occurring during the calculation, that is e.g. the value which is in a certain register of a processor of the data carrier at a certain point in time. In a second-order side channel attack, the attacker is able to ascertain two such values, that is e.g. the content of a processor register at two different points in time, or the content of two registers at a point in time. Accordingly, with a third-order side channel attack three values are spied out, and so on.

For thwarting side channel attacks, a protection measure by software is known which consists in masking data to be kept secret before carrying out cryptographic calculations, i.e. falsifying them with a value referred to as a mask. The mask is selected as a random value before each execution of the cryptographic calculation—or at other points in time. The cryptographic calculation is then not carried out with the data to be kept secret, but with their masked representation. Even if an attacker succeeds in ascertaining the masked representation by a first-order side channel attack, no conclusions can be drawn therefrom about the data to be kept secret because of the masking.

A masking of a value to be kept secret can be based on different masking rules. The masking rule indicates the calculation rule according to which the data to be protected are linked to the mask in order to obtain the masked representation. Which masking rule is suitable depends on the type of cryptographic calculation.

If the cryptographic calculation substantially consists of bitwise operations, as a masking rule there is often suitable an exclusive-or-operation (xor operation; in this document also referred to by the operator symbol $\oplus$). That is, from a value d to be kept secret, a masked representation x with $x=d \oplus s$ is derived, where s is the randomly selected mask. Such a masking rule and also related masking rules, which e.g. have additional inversions of individual bits, in this document are referred to as Boolean masking rules, and the masks used are referred to as Boolean masks.

However, if the cryptographic calculation substantially consists of byte- or word-wise additions or comparable operations, often an addition or subtraction makes sense as a masking rule. Instead of the value d to be kept secret, there is thus processed e.g. a masked representation x with one of the masking rules $x=d+r \bmod 2^n$ or $x=d-r \bmod 2^n$ or $x=r-d \bmod 2^n$ or $x=-(d+r) \bmod 2^n$, where n is the bit width with which the calculations are executed. In the present document, such masking rules and also related masking rules, in which e.g. also a multiplication by a constant factor takes place, are referred to as additive masking rules, and this regardless of whether an addition or a subtraction is executed when masking. This corresponds to the usual terminology according to which both the addition and the subtraction are regarded as additive operations. Accordingly, the masks used are referred to as additive masks.

If implemented without error, the Boolean and additive masking rules just mentioned prevent first-order side channel attacks. But these rules offer no protection against second-order side channel attacks, because e.g. with the Boolean masking rule an attacker who spies out the values x and s can ascertain therefrom the value d to be kept secret. However, according to an at least internal state of the art of the applicant, protection against second-order side channel attacks can be achieved by effecting a masking with two randomly selected masks. For example, a Boolean masking with two randomly selected masks $s_1$, $s_2$ and the masking rule $x=d \oplus s_1 \oplus s_2$ is secure against second-order side channel attacks. The same applies to an additive masking with two randomly selected masks $r_1$, $r_2$ and a masking rule of the form $x=\pm d \pm r_1 + r_2 \bmod 2^n$, and thus for example $x=d+r_1+r_2 \bmod 2^n$.

Irrespective of the number of masks and of the "strength" of the protection achieved, a difficulty arises when during the cryptographic calculation operations are successively executed that are only compatible with different masking rules. This is the case, for example, with symmetrical encryption methods such as IDEA (International Data Encryption Algorithm), SAFER K-64 and RC5 as well as hash algorithms such as MD5 or SHA-1. For some sections of these algorithms, a Boolean masking is useful, while additive masking is more advantageous for other sections.

At the interfaces between these sections it is therefore necessary to create a transition from one type of masking to the other. Here, too, attention has to be paid that an attacker cannot obtain any usable information about the value to be protected. Therefore, for example, it is out of the question to use a procedure where with a masking with the Boolean mask s at first the value d to be kept secret is determined from the masked representation x by an xor operation with the Boolean mask s and then the new masked representation is calculated by using the value d and an additive mask r.

From the printed patent specification EP 1 596 527 B1, a method is known for the masking transition from a Boolean masking of a value to be kept secret to an additive masking of the value to be kept secret. This procedure has proved to be very helpful in practice, but it is only protected against first-order side channel attacks.

In the article "A Sound Method for Switching between Boolean and Arithmetic Masking" by L. Goubin, published in the conference proceedings of the "Workshop on Cryptographic Hardware and Embedded Systems 2001 (CHES 2001)", volume 2162 of the Lecture Notes in Computer Science, Springer-Verlag, 2001, pages 3-15, methods of masking transition are described which are protected against first-order side channel attacks. In these methods, a new masked representation of the value to be kept secret is calculated without changing the mask. These procedures are also disclosed in the laid-open print WO 02/065692 A1.

The article "Efficient and Provably Secure Methods for Switching from Arithmetic to Boolean Masking" by Blandine Debraize, published in the conference proceedings of the "Workshop on Cryptographic Hardware and Embedded Systems 2012 (CHES 2012)", Volume 7428 of the Lecture Notes in Computer Science, Springer-Verlag, 2012, pages 107-121, describes another method, protected against spying out, of masking transition that is referred to as secure against first-order side channel attacks and as particularly efficient.

A protection against first-order side channel attacks is already an important advantage. Recently, however, it has become increasingly important to also offer protection against second-order side channel attacks. This is e.g. a requirement for certain security levels of the Common Criteria for Information Technology Security Evaluation according to the ISO/IEC 15408 standard, and also for EMVCo evaluations. It would therefore be desirable to supply a masking transition method which includes an increased protection against side channel attacks compared to known methods. Further, it would be desirable if the procedure could be implemented efficiently despite the high level of security offered.

SUMMARY

It is the object of the invention to create an advantageous technique for the transition, protected against spying out, from a Boolean masking of a value to be kept secret to an additive masking of the value to be kept secret, which is protected against second-order side channel attacks.

The invention starts out from the basic idea of executing the masking transition in the form of a total of three simpler masking transitions. These masking transitions are referred to in the description and the claims as "first", "second" and "third" masking transitions. However, this is merely intended to provide a clearer presentation and is not intended to imply an order of execution. Depending on the implementation and the order in which certain intermediate results are generated and required, other orders of the masking transitions and/or a wholly or partially parallel or wholly or partially interleaved execution are also possible and provided.

The method according to the invention is secured against second-order side channel attacks, among other things, by the result of the first masking transition, namely the first additive mask, itself being a masked representation in which an obfuscation value serving as Boolean mask is used. This obfuscation value is converted into an additive correction value in the second masking transition. In the third masking transition, the second additive mask is determined. In some embodiments the correction value may be incorporated in the second mask, in other embodiments it can be output separately from the second mask, and in still further embodiments it can be used in other ways.

In some configurations, the obfuscation value serving as a Boolean mask and/or further obfuscation values are determined randomly. For example, a total of three random obfuscation values can be provided for one course of the method. In some embodiments, the three masking transitions are executed with three different base values, one of which can be the value to be kept secret. Of course, this does not mean that this value is present in plaintext (and would therefore be vulnerable to be spied out), but only means that the masking transition uses this base value conceptually.

Altogether, the method preferably serves for the protection against second-order side-channel attacks, even if, as is provided in some embodiments, at least one or at least two of the simpler masking transitions (when regarded alone) is or are only protected against first-order side channel attacks.

Preferably, the masking transition method is embedded between two sections of a cryptographic calculation. In some configurations, here, at first the masked representation is generated or processed by an operation compatible with the Boolean masking rule, then the masking transition is effected, and finally the masked representation is further processed by an operation compatible with the additive masking rule.

The computer program product of the invention includes program commands, in order to implement the method of the invention. Such a computer program product can be a physical medium, e.g. a semiconductor memory or a CD-ROM. The computer program product can also be a non-physical medium, however, e.g., a signal transmitted via a computer network. In particular, the computer program product may contain program commands which are introduced into a portable data carrier or chip module in the course of its manufacture or initialization or personalization.

The device according to the invention can in particular be a portable data carrier, e.g. a chip card or a chip module. Such a data carrier contains in the way known in the art at least one processor, several memories configured with different technologies and various auxiliary modules such as e.g. interface circuits, timers and connection elements.

In preferred developments, the computer program product and/or the device have features which correspond to the features mentioned in the present description and/or stated in the dependent method claims.

Further features, objects and advantages of the invention can be found in the following description of several exemplary embodiments, alternative embodiments and exemplary implementations. Reference is made to the schematic drawing.

BRIEF DESCRIPTION OF THE DRAWINGS

FIG. 1 as the only FIGURE shows a diagram illustrating the operations of an embodiment example of the invention and the data utilized and generated by these operations.

DETAILED DESCRIPTION OF VARIOUS EMBODIMENTS

In FIG. 1 there is depicted a part of a cryptographic calculation, e.g. of a hash function or of an IDEA encryption or decryption. A masking transition method 10 according to an embodiment example of the invention is embedded between a first section 12 and a second section 14 of the cryptographic calculation. The operations of the cryptographic calculation executed in the first section 12 are compatible with a Boolean masking rule and are executed using several Boolean masks. The result of the first section 12 is a masked representation x of a value d to be kept secret, which is masked according to a Boolean masking rule with two Boolean masks $s_1$, $s_2$; thus it holds e.g. that $x = d \oplus s_1 \oplus s_2$.

The second section 14 of the cryptographic calculation comprises further operations, which, however, are not compatible with the Boolean masking rule, but only with an additive masking rule. In the present embodiment example, the masking rule used in the second section 14 is $x=d+r_{1a}+r_{2a} \mod 2^n$, where $r_{1a}$ and $r_{2a}$ are each an additive mask and n indicates the word width in bits of the calculation performed. The masking transition method 10 should therefore determine, from the first masking of the value d to be kept secret with the Boolean masks $s_1$, $s_2$, a second masking which includes two additive masks $r_{1a}$ and $r_{2a}$. In the configuration described first here, the masked representation x is to remain unchanged during the execution of the masking transition method 10, while this is not the case in other configurations described later.

In the embodiment example described here, the masking transition method 10 includes a total of three simpler masking transitions 16, 18, 20. These masking transitions 16, 18, 20 are here also referred to as "first", "second" and "third" masking transitions. This, however, only serves to simplify the naming without implying an order of execution. In implementation variants, the three masking transitions 16, 18, 20 can be executed in a different order or e.g. in an interleaved fashion, i.e. for example first a part of the third masking transition 20, which does not require the correction value a, and only then the second masking transition 18.

Before describing the masking transitions 16, 18, 20 in more detail, now two general formulas are explained for a better understanding, with which masking transitions can be executed in a manner protected against first-order side channel attacks.

A masked representation x of a base value d to be kept secret, with a Boolean mask s is given, so that thus it holds that $x=d \oplus s$. What is to be calculated is an arithmetic mask r with which the masked representation x presents the base value d to be kept secret, for which it thus holds that $x=d+r \mod 2^n$ with a given calculation bit width n. In order to secure the calculation against a first-order side channel attack, a random obfuscation value z is introduced. The arithmetic mask r then results from the formula:

$$r=((d \oplus s \oplus z)-(d \oplus z)) \oplus s \oplus ((s \oplus z)-z)$$

This relation, hereinafter referred to as "XOR2ADD formula", is already known in slightly modified form from EP 1 596 527 B1. The correctness of the XOR2ADD formula results from a consideration of the function defined by $F(x, s):=(x-(x \oplus s)) \mod 2^n$. For the above-mentioned masked representation x of the base value d to be kept secret and the above-mentioned Boolean mask s, the value $F(x, s)$ presents the searched additive mask r, because it holds that $d+F(x, s)=d+(x-(x \oplus s))=d+x-d=x$. For the mapping $F(\_, s)$ it holds that: $F(x \oplus y, s)=F(x, s) \oplus F(y, s) \oplus F(0, s)$. This results in the following equation chain:

$$\begin{aligned} r &= F(x, s) \\ &= F((x \oplus z) \oplus (z \oplus s) \oplus s, s) \\ &= F(x \oplus z, s) \oplus F(z \oplus s, s) \oplus F(s, s) \\ &= ((x \oplus z) - (x \oplus z \oplus s)) \oplus ((z \oplus s) - z) \oplus s \end{aligned}$$

The XOR2ADD formula follows by replacing the value x by $d \oplus s$ in the just derived relation for r.

The above mentioned XOR2ADD formula can be extended by using not only one random obfuscation value z, but two obfuscation values $z_1$ and $z_2$. Depending on the security requirements, the obfuscation values $z_1$, $z_2$ may each be random in themselves, or there may be certain dependencies either between the obfuscation values $z_1$, $z_2$ among themselves or between one of the obfuscation values $z_1$, $z_2$ and another value. Using the two obfuscation values $z_1$, $z_2$, the arithmetic mask r then results from the following relation, which is referred to here as the "extended XOR2ADD formula":

$$r=((d \oplus s \oplus z_1 \oplus z_2)-(d \oplus z_1 \oplus z_2)) \oplus ((s \oplus z_1)-z_1) \oplus ((s \oplus z_2)-z_2)$$

As already briefly explained above, the masking transition method 10 in the embodiment example shown in FIG. 1 starts out from a base value d to be kept secret, which is present in a first masking in the form of a representation x masked with two Boolean masks $s_1$, $s_2$ according to a Boolean masking rule; it thus holds that $x=d \oplus s_1 \oplus s_2$. According to the present embodiment example, two additive masks $r_{1a}$, $r_{2a}$ are determined, so that it holds that $x=d+r_{1a}+r_{2a} \mod 2^n$. In other words, a second masking of the base value d to be kept secret is ascertained, in which the masked representation x is also a masked representation according to an additive masking rule with the masks $r_{1a}$, $r_{2a}$. The masking transition method 10 shown in FIG. 1 utilizes for this one masking transition according to the XOR2ADD formula and two masking transitions according to the extended XOR2ADD formula. The masking transition method 10 is protected against second-order side channel attacks; even if two intermediate results are known, no information can be derived about the value d to be kept secret.

In an experimental approach, which is now first described as an introduction to the embodiment example, two additive masks $r_1$, $r_2$ with $x=d+r_1+r_2$ would be determined by first performing an "inner" masking transition from $d \oplus s_1$ to $d+r_1$ and then an "outer" masking transition from $(d+r_1) \oplus s_2$ to $(d+r_1)+r_2$. Each of these two masking transitions is effected according to the experimental approach according to the extended XOR2ADD formula with suitable obfuscation values. Thus, according to the experimental approach, the value $r_1$ with two obfuscation values $z_1$, $z_2$ results from the following relation, which is referred to as "(A0)":

$$r_1=((d \oplus s_1 \oplus z_1 \oplus z_2)-(d \oplus z_1 \oplus z_2)) \oplus ((s_1 \oplus z_1)-z_1) \oplus ((s_1 \oplus z_2)-z_2)$$

When analysing the experimental approach just described, however, the inventors surprisingly realized that the calculation of $r_1$ according to the relation (A0) is susceptible to second-order side channel attacks because an attacker could draw conclusions about the value d to be kept secret from the knowledge of n and $s_1$. In the embodiment example described now, the experimental approach is hence modified to the extent that with the first masking transition 16 there is not determined the additive mask $r_1$ corresponding to the Boolean mask $s_1$, but instead a value $r_{1a}$ modified compared to $r_2$. The value $r_{1a}$, which presents the first mask searched for altogether, is the Boolean masking of the value $r_1$ with another Boolean mask, namely a randomly selected obfuscation value a. Thus, it holds that $r_{1a}=r_1 \oplus a$, from which the following relation (A1) results by inserting the above relation (A0):

$$r_{1a}=((d \oplus s_1 \oplus z_1 \oplus z_2)-(d \oplus z_1 \oplus z_2)) \oplus ((s_1 \oplus z_1)-z_1) \oplus ((s_1 \oplus z_2)-z_2) \oplus a$$

Since in the equation $x=d \oplus s_1 \oplus s_2$ the exclusive-or-operations can be shifted arbitrarily from the right to the left side, the relation (A1) can also be written as relation (A2) as follows:

$$r_{1a}=((x \oplus s_2 \oplus z_1 \oplus z_2)-(x \oplus s_1 \oplus s_2 \oplus z_1 \oplus z_2)) \oplus ((s_1 \oplus z_1)-z_1) \oplus ((s_1 \oplus z_2)-z_2) \oplus a$$

The relation (A2) depicts the first masking transition 16 according to the embodiment example described here. With a suitable implementation, the calculation of the relation (A2) is secure against second-order side channel attacks.

As according to (A2), the value $r_{1a}$ was calculated instead of the actually desired value $r_1$, a correction step is required in the embodiment example described here, for which the Boolean obfuscation value a is converted into a corresponding additive correction value α. As already mentioned, the value a depicts the mask according to a Boolean masking $r_{1a}=r_1 \oplus a$ of the value $r_1$. In the correction step, the Boolean mask a with the base value $r_1$ is therefore converted into a corresponding additive mask α, for which it thus holds that $r_{1a}=r_1+\alpha$. For this, the non-extended XOR2ADD formula and a further random obfuscation value $z_3$ are used, so that the following relation (B) results:

$$\alpha=((r_1 \oplus a \oplus z_3)-(r_1 \oplus z_3)) \oplus a \oplus ((a \oplus z_3)-z_3)$$

In the embodiment example described here, the relation (B) depicts the second masking transition 18. The value $r_1$ does not have to be explicitly used for the calculation of α, but the knowledge of the values $r_{1a}=r_1 \oplus a$ and a is sufficient.

Now, a further masking transition is required, which in the present embodiment example is based on the "outer" masking transition of the above-described experimental approach from $(d+r_1) \oplus s_2$ to $(d+r_1)+r_2$. For this, the extended XOR2ADD formula and two further obfuscation values $z_4$, $z_5$ are used, so that the following relation designated as "(C0)" results:

$$r_2=(((d+r_1) \oplus s_2 \oplus z_4 \oplus z_5)-((d+r_1) \oplus z_4 \oplus z_5)) \oplus ((s_2 \oplus z_4)-z_4) \oplus ((s_2 \oplus z_5)-z_5)$$

Since it holds that $x=(d+r_1) \oplus s_2$, the relation (C1) can also be written as a relation (C2) as follows:

$$r_2=((x \oplus z_4 \oplus z_5)-(x \oplus s_2 \oplus z_4 \oplus z_5)) \oplus ((s_2 \oplus z_4)-z_4) \oplus ((s_2 \oplus z_5)-z_5)$$

By using the two obfuscation values $z_4$ and $z_5$, no further protective measures against second-order side channel attacks are required. However, the result $r_2$ is not yet the desired second additive mask $r_{2a}$, because the use of the obfuscation value a has increased the first additive mask $r_{1a}$, compared to $r_1$, by the value α. This correction value α must now be subtracted from the result $r_2$, so that the second additive mask $r_{2a}$ with $r_{2a}=r_2-\alpha$ results. In total, the second mask $r_{2a}$ is thus determined by the following relation (C3):

$$r_{2a}=r_2-\alpha=(((x \oplus z_4 \oplus z_5)-(x \oplus s_2 \oplus z_4 \oplus z_5)) \oplus ((s_2 \oplus z_4)-z_4) \oplus ((s_2 \oplus z_5)-z_5)))-\alpha$$

In the embodiment example described here, the relation (C3) depicts the third masking transition 20.

Altogether, the two additive masks $r_{1a}$ (according to relation (A2)) and $r_{2a}$ (according to relation (C3)) thus obtained form the desired result of the masking transition method 10, because it holds that:

$$x=d+r_1+r_2=d+(r_{1a}-\alpha)+(r_{2a}+\alpha)=d+r_{1a}+r_{2a}$$

It is to be understood that in alternative embodiments various modifications of the embodiment example just described are possible. For example, the method can be modified in such a way that not the corrected value $r_{2a}$ is output as the second mask, but instead the uncorrected value $r_2$ and separately therefrom the correction value α.

Further, in the above-described embodiment example, besides the obfuscation value a five further obfuscation values $z_1, z_2, z_3, z_4$ and $z_5$ are employed. In a simple but not very efficient implementation, independent random numbers can be used for these values. For optimization reasons, however, there are also provided implementations in which the obfuscation values are derived from fewer random numbers. Of course, one must make sure that the protection against spying out the method is not impaired. As can be seen from the two following exemplary implementations, however, it is possible to reduce the number of independent random numbers for the masking transition method 10 to three without compromising the protection against spying out.

As already mentioned, various modifications of the masking transition method 10 are further provided, in which the masking transitions 16, 18 and 20—or parts thereof—are executed in a different order than that described above.

In the following, two further embodiment examples of the masking transition method are depicted with reference to two exemplary implementations. In order to avoid misunderstandings, it should be noted that the naming conventions used in the following differ from those of the embodiment example described above.

The first exemplary implementation starts out from the input values x, y and z, where y and z are Boolean masks and x is a masked representation of a base value d to be kept secret (which is not available as input value). Thus, it holds that $x=d \oplus y \oplus z$. Then the following method steps are executed:

| Select random obfuscation values r, s and a | | | (step 1) |
|---|---|---|---|
| t | ← | $s \oplus r$ | (step 2) |
| zs | ← | $z \oplus s$ | (step 3) |
| xr | ← | $x \oplus r$ | (step 4) |
| ztxr | ← | $zs \oplus x$ | (step 5) |
| ztyr | ← | $zs \oplus y$ | (step 6) |
| s11 | ← | ztxr − x | (step 7) |
| s12 | ← | ztyr − y | (step 8) |
| s13 | ← | s − z | (step 9) |
| ra | ← | $r \oplus a$ | (step 10) |
| s11ra | ← | $s11 \oplus ra$ | (step 11) |
| s112ra | ← | $s11ra \oplus s12$ | (step 12) |
| r1ra | ← | $s112ra \oplus s13$ | (step 13) |
| r1a | ← | $r1ra \oplus r$ | (step 14) |
| r1r | ← | $r1ra \oplus a$ | (step 15) |
| s31 | ← | r1ra − r1r | (step 16) |
| s32 | ← | ra − r | (step 17) |
| s31a | ← | $s31 \oplus a$ | (step 18) |
| alpha | ← | $s3la \oplus s32$ | (step 19) |
| yt | ← | $y \oplus t$ | (step 20) |
| xry | ← | $xr \oplus y$ | (step 21) |
| s21 | ← | xry − x | (step 22) |
| s22 | ← | yt − s | (step 23) |
| s23 | ← | r − y | (step 24) |
| s21s | ← | $s21 \oplus s$ | (step 25) |
| s212s | ← | $s21s \oplus s22$ | (step 26) |
| r2s | ← | $s212s \oplus s23$ | (step 27) |
| r2 | ← | $r2s \oplus s$ | (step 28) |
| r2a | ← | r2 − alpha | (step 29) |
| xm | ← | $xr \oplus s$ | (step 30) |

As a result, one obtains the two additive masks r1a and r2a as well as a changed masked representation xm of the base value d. Altogether, it holds that:

$$xm=x \oplus r \oplus s=d \oplus (y \oplus r) \oplus (z \oplus s)=d+r1a+r2a$$

The just described first implementation contains 29 elementary operations. However, the input-masked representation x differs from the output-masked representation xm. This is acceptable for many applications. For applications in which the masked representation is not to be changed by the masking transition, the following second implementation can be employed. This second implementation does not introduce any additional intermediate values and differs from the first implementation with regard to the naming of the input values and output values as well as with regard to the steps 1, 2, 4, 10 and 21.

For the second exemplary implementation, the input values xm, yt and z are provided, where yt and z are Boolean masks and xm is a masked representation of the base value d to be kept secret. Thus, it holds that xm=d⊕yt⊕z. Then the following method steps are executed:

| Select random obfuscation values y, s and a | | (step 1') |
|---|---|---|
| t | ← yt ⊕ y | (step 2') |
| zs | ← z ⊕ s | (step 3') |
| x | ← xm ⊕ t | (step 4') |
| ztxr | ← zs ⊕ x | (step 5') |
| ztyr | ← zs ⊕ y | (step 6') |
| s11 | ← ztxr − x | (step 7') |
| s12 | ← ztyr − y | (step 8') |
| s13 | ← s − z | (step 9') |
| r | ← t ⊕ s | (step 10') |
| ra | ← r ⊕ a | (step 11') |
| s11ra | ← s11 ⊕ ra | (step 12') |
| s112ra | ← s11ra ⊕ s12 | (step 13') |
| r1ra | ← s112ra ⊕ s13 | (step 14') |
| r1a | ← r1ra ⊕ r | (step 15') |
| r1r | ← r1ra ⊕ a | (step 16') |
| s31 | ← r1ra − r1r | (step 17') |
| s32 | ← ra − r | (step 18') |
| s31a | ← s31 ⊕ a | (step 19') |
| alpha | ← s31a ⊕ s32 | (step 20') |
| xr | ← x ⊕ r | (step 21') |
| xry | ← xr ⊕ y | (step 22') |
| s21 | ← xry − x | (step 23') |
| s22 | ← yt − s | (step 24') |
| s23 | ← r − y | (step 25') |
| s21s | ← s21 ⊕ s | (step 26') |
| s212s | ← s21s ⊕ s22 | (step 27') |
| r2s | ← s212s ⊕ s23 | (step 28') |
| r2 | ← r2s ⊕ s | (step 29') |
| r2a | ← r2 − alpha | (step 30') |

As a result, one obtains the two additive masks r1a and r2a. The masked representation xm of the base value d to be kept secret remains unchanged. Altogether, it holds that:

$$xm = d \oplus (y \oplus r) \oplus (z \oplus s) = d + r1a + r2a$$

By numerical simulation for all input values with a width of 4 bits, it was proven for the two implementations just described that they are resistant to second-order side channel attacks.

The correctness of the above first implementation can be illustrated as follows. According to the relation (A2) from the first embodiment example it holds that:

$$r_{1a} = ((x \oplus s_2 \oplus z_1 \oplus z_2) - (x \oplus s_1 \oplus s_2 \oplus z_1 \oplus z_2)) \oplus ((s_1 \oplus z_1) - z_1) \oplus ((s_1 \oplus z_2) - z_2) \oplus a$$

With $z_2 := z$ and $s_1 := z \oplus s = zs$ there first follows that:

$$r_{1a} = ((x \oplus s_2 \oplus z_1 \oplus z) - (x \oplus S\, s_2 \oplus z_1)) \oplus ((zs \oplus z_1) - z_1) \oplus (s - z) \oplus a$$

Through the substitution $z_1 := y$ it further results that:

$$r_{1a} = ((x \oplus s_2 \oplus y \oplus z) - (x \oplus s \oplus s_2 \oplus y)) \oplus ((zs \oplus y) - y) \oplus (s - z) \oplus a$$

With $x \oplus s_2 := x \oplus y \oplus s$ and $a := a$, it finally results that:

$$r_{1a} = ((x \oplus s \oplus z) - x) \oplus ((zs \oplus y) - y) \oplus (s - z) \oplus a$$

However, this corresponds exactly to the value r1a calculated as the result of steps (2)-(14) of the first implementation, because it holds that:

$$r1a = s11 \oplus s12 \oplus s13 \oplus a$$
$$= ((zs \oplus x) - x) \oplus ((zs \oplus y) - y) \oplus (s - z) \oplus a$$

The same holds for to the value $r_2$ according to the relation (C2):

$$r_2 = ((x \oplus z_4 \oplus z_5) - (x \oplus s_2 \oplus z_4 \oplus z_5)) \oplus ((s_2 \oplus z_4) - z_4) \oplus ((s_2 \oplus z_5) - z_5)$$

With $s_2 := y \oplus r = yr$ and $z_5 := y$ one obtains:

$$r_2 = ((x \oplus z_4 \oplus y) - ((x \oplus yr) \oplus y \oplus z_4)) \oplus ((yr \oplus z_4) - z_4) \oplus (r - y)$$

Then, with $z_4 := s$ it finally results that:

$$r_2 = ((x \oplus s \oplus y) - ((x \oplus yr) \oplus y \oplus s)) \oplus ((yr \oplus s) - s) \oplus (r - y)$$
$$= ((x \oplus r \oplus y) - x) \oplus ((y \oplus t) - s) \oplus (r - y)$$

However, this corresponds exactly to the value r2 which was calculated according to steps (20)-(28) of the first implementation as follows:

$$r2 = s21 \oplus s22 \oplus s23$$
$$= ((x \oplus r \oplus y) - x) \oplus ((y \oplus t) - s) \oplus (r - y)$$

The method according to FIG. 1 and the embodiment examples, alternative embodiments and implementations described here are provided to be executed by a processor of a portable data carrier, in particular of a chip card or a chip module. The methods are implemented in the form of program commands which are contained in a ROM or an EEPROM or other memory of the data carrier.

The invention claimed is:

1. A method for a masking transition of a cryptographic calculation, the masking transition being a transition from a Boolean masking of a value to be kept secret to an additive masking of the value to be kept secret, the value to be kept secret being present in the Boolean masking as a representation masked with a first Boolean mask and a second Boolean mask, and wherein a first additive mask and a second additive mask are determined for the value to be kept secret, the method comprising:
   executing a first masking transition in which the first Boolean mask is converted into the first additive mask, wherein the first additive mask is a masked representation of an additive mask corresponding to the first Boolean mask, wherein the first additive mask is masked with an obfuscation value serving as a Boolean mask;
   executing a second masking transition in which the obfuscation value is converted into an additive correction value; and
   executing a third masking transition in which the second Boolean mask is converted into the second additive mask,
   wherein a Boolean masked representation results from applying the first Boolean mask and the second Boolean mask to the value to be kept secret and an additive masked representation results from applying the first additive mask and the second additive mask to the value to be kept secret, and
   wherein the Boolean masked representation has a same value as the additive masked representation.

2. The method according to claim 1, wherein the obfuscation value serving as the Boolean mask is determined randomly.

3. The method according to claim 1, wherein at least two further random obfuscation values are used and each of the first, second, and third masking transitions uses at least one of these further random obfuscation values or a value derived therefrom.

4. The method according to claim 1, wherein at least two further random obfuscation values are used and both the first and the third masking transition respectively use at least two of the further random obfuscation values or values derived therefrom.

5. The method according to claim 1, wherein the first masking transition is executed with the value to be kept secret as a base value.

6. The method according to claim 1, wherein the second masking transition is executed with a base value which results from an additive mask corresponding to the first Boolean mask.

7. The method according to claim 1, wherein the third masking transition is executed with a base value which results from an additive masking of the value to be kept secret with an additive mask corresponding to the first Boolean mask.

8. The method according to claim 1, wherein the third masking transition is executed at least partly before the first masking transition or at least partly before the second masking transition.

9. The method according to claim 1, wherein the second additive mask is determined by applying the additive correction value in an additive operation to an additive mask corresponding to the second Boolean mask.

10. The method according to claim 1, wherein the second additive mask corresponds to the second Boolean mask and that the additive correction value is supplied as a further method result.

11. The method according to claim 1, wherein the method is embedded between a first section and a second section of the cryptographic calculation,
wherein in the first section the masked representation is generated or processed by at least one operation which is compatible with the Boolean masking, and in the second section the masked representation is further processed by at least one operation which is compatible with the arithmetic masking.

12. The method according to claim 1, wherein at least one of the first, second and third masking transition is executed according to a method which, when regarded alone, is protected against first-order side channel attacks, but not against second-order side channel attacks.

13. The method according to claim 1, wherein the method serves for the protection against second-order side channel attacks.

14. A computer program product having a plurality of program commands which cause at least one processor to execute a method of claim 1.

15. The method according to claim 1, further comprising encrypting the Boolean masked representation, which is a value that results from applying the first Boolean mask and the second Boolean mask to the value to be kept secret, to generate encrypted data for secure communication.

16. The method according to claim 15, further comprising securely communicating the encrypted Boolean masked representation.

17. The method according to claim 1, further comprising preventing a side channel attack of the value to be kept secret by encrypting the Boolean masked representation rather than directly encrypting the value to be kept secret, and providing the encrypted the Boolean masked representation for secure communications.

18. A device comprising:
a portable data carrier or chip module,
wherein the device includes at least one processor and at least one memory, and
wherein the device is arranged to execute a method for a masking transition of a cryptographic calculation, the masking transition being a transition from a Boolean masking of a value to be kept secret to an additive masking of the value to be kept secret, the value to be kept secret being present in the Boolean masking as a representation masked with a first Boolean mask and a second Boolean mask, and wherein a first additive mask and a second additive mask are determined for the value to be kept secret, the method including
executing a first masking transition in which the first Boolean mask is converted into the first additive mask, wherein the first additive mask is a masked representation of an additive mask corresponding to the first Boolean mask,
wherein the additive mask is masked with an obfuscation value serving as a Boolean mask;
executing a second masking transition in which the obfuscation value is converted into an additive correction value; and
executing a third masking transition in which the second Boolean mask is converted into the second additive mask,
wherein a Boolean masked representation results from applying the first Boolean mask and the second Boolean mask to the value to be kept secret and an additive masked representation results from applying the first additive mask and the second additive mask to the value to be kept secret, and
wherein the Boolean masked representation has a same value as the additive masked representation.

* * * * *